July 15, 1952     H. J. PANKRATZ ET AL     2,603,667
FRACTIONAL CRYSTALLIZATION

Filed Jan. 26, 1950     3 Sheets-Sheet 1

INVENTORS.
H. J. PANKRATZ
H. A. DUTCHER
C. E. ALLEMAN

BY Hudson + Young
ATTORNEYS

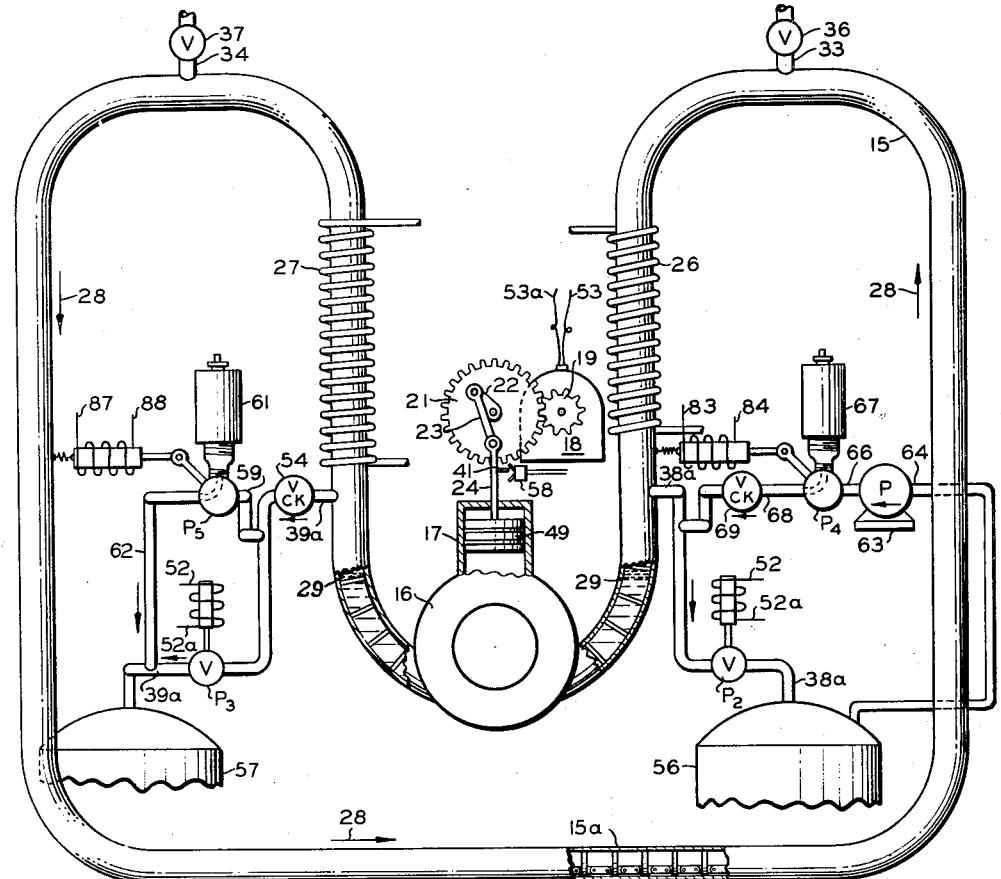
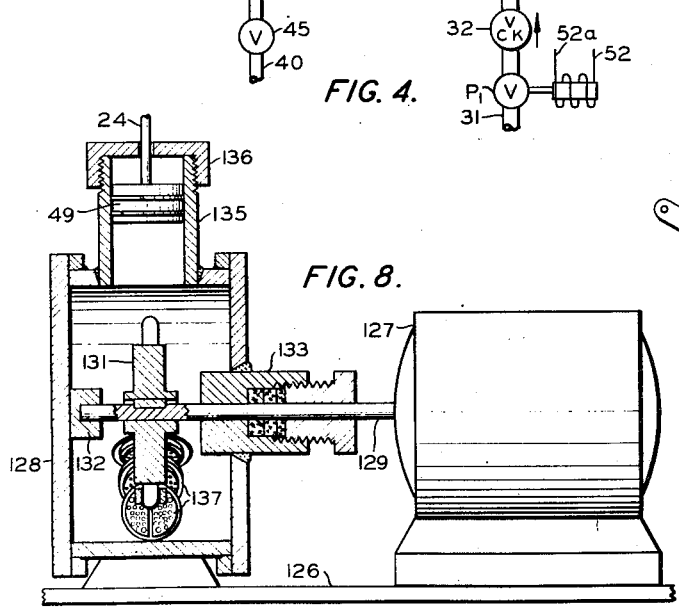
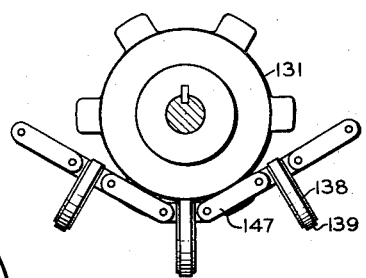
July 15, 1952    H. J. PANKRATZ ET AL    2,603,667
FRACTIONAL CRYSTALLIZATION
Filed Jan. 26, 1950     3 Sheets-Sheet 3
FIG. 4.
FIG. 8.
FIG. 10.
INVENTORS.
H. J. PANKRATZ
H. A. DUTCHER
C. E. ALLEMAN
BY Hudson & Young
ATTORNEYS Patented July 15, 1952

2,603,667

UNITED STATES PATENT OFFICE 2,603,667

FRACTIONAL CRYSTALLIZATION

Howard J. Pankratz and Harris A. Dutcher, Bartlesville, Okla., and Carl E. Alleman, Cactus, Tex., assignors to Phillips Petroleum Company, a corporation of Delaware Application January 26, 1950, Serial No. 140,644

13 Claims. (Cl. 260—707)

This invention relates to a continuous fractional crystallizer. In one of its more specific aspects it relates to an improved fractional crystallizer of the continuous crystal conveyor type for the separation of mixtures. In another specific aspect it relates to the purification of compounds by crystallization. In another specific aspect it relates to an apparatus for carrying out fractional crystallization.

Fractional crystallization is a process for separating one component of a mixture from the remaining component or components by causing it to crystallize out and removing the crystals from the zone of crystallization to a melting zone from which the component is recovered as a melt. In most cases the crystals which are formed are of the higher melting component of the mixture; however, in the case of eutectic mixtures the crystals may or may not be of the higher melting component, but will be of that component present in excess of the eutectic ratio. Apparatus previously developed for the separation of crystals from mother liquor in the process of fractional crystallization have generally been of the reciprocating type, i. e. comprising an elongated cylinder with a conveyor therein which when moving in one direction moves crystals from the crystallizing end of the apparatus to a crystal removal zone and when moving in the opposite direction to pick up another group of crystals passes through the materials being separated with as little disturbance as possible. The obvious disadvantage of such an apparatus is the turbulence caused in the materials being separated by the movement of the conveyor when going back to pick up more crystals. Such turbulence greatly cuts down the efficiency of the apparatus. This problem is one of those avoided by applicants with the development of their apparatus. Another problem also encountered in such apparatus is jamming of the conveyor when large quantities of crystals are formed. This also has been overcome in the apparatus of applicants.

An object of this invention is to provide an improved process and apparatus for continuous fractional crystallization.

Another object of this invention is to provide an improved apparatus for the separation of mixtures by fractional crystallization.

Another object is to provide a fractional crystallization apparatus wherein the crystals are washed advantageously thereby enabling the recovery of more pure compounds.

Still another object of this invention is to provide an improved fractional crystallization apparatus and a method for operating same automatically.

Further objects and advantages of this invention will be apparent to one skilled in the art from the accompanying disclosure and discussion.

Refer now to the drawings. Figure 1 is an elevation view of one modification of our invention wherein a liquid seal is used between the separated components.

Figures 3 and 5 are schematic diagrams of the controlling apparatus used in conjunction with the crystallizers of our invention.

Figure 4 is an elevation view of a preferred embodiment of our invention including apparatus for intermittently washing the crystals formed with purified product.

Figure 7 is an elevation view of another embodiment of our invention utilizing gas or vapor to separate the purified components of the mixture being separated.

Figure 8 is a cross sectional view of one type of apparatus for driving the continuous conveyor used in the apparatus of our invention.

Figure 9 is an isometric view of a suitable conveyor flight which is used in the apparatus of our vention.

Figure 10 is a front elevation of one embodiment of the sprocket used for driving the continuous conveyor, and shows the relationship between the sprocket and conveyor.

Figure 1:
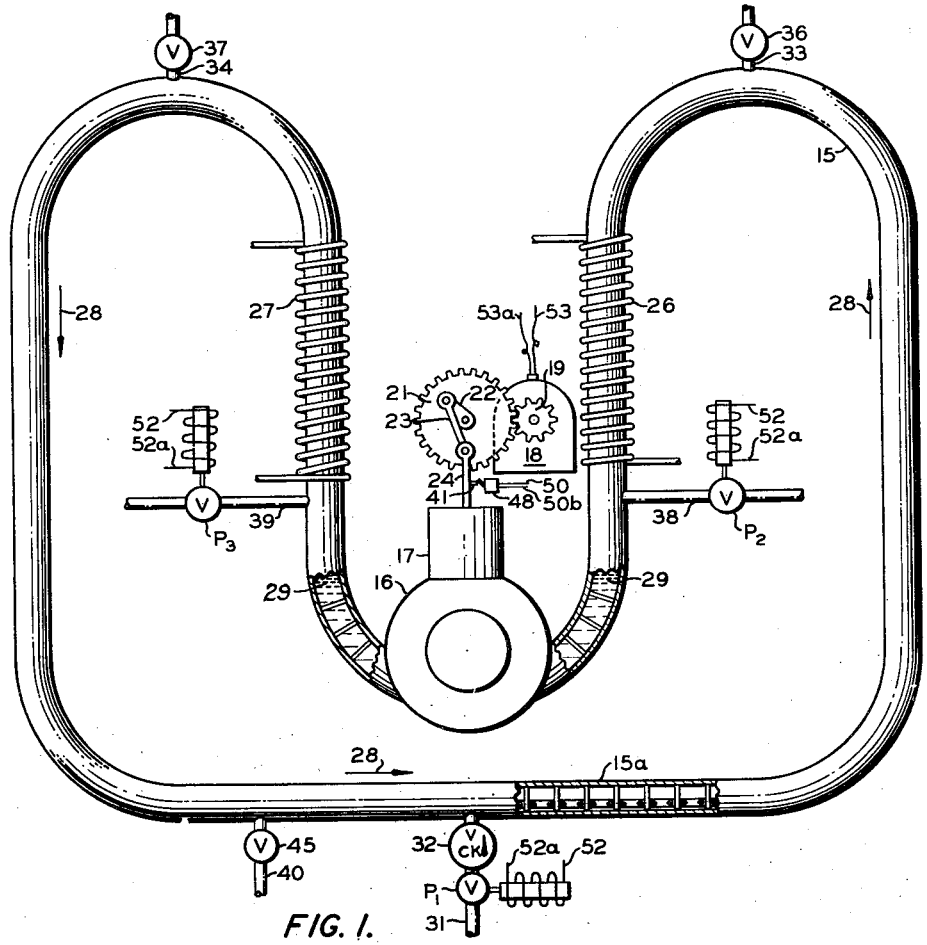

Refer now to Figure 1. Number 15 is a vertically positioned housing for a continuous conveyor, preferably of a circular cross section and having an over-all shape of a loop with a U pocket. Number 16 is the housing containing the drive mechanism for the conveyor. This unit, more fully discussed with respect to Figure 8, contains a heavy sealing liquid, heavier than the liquid in housing 15. This liquid is any which is heavier than the liquid in the housing and which is immiscible and unreactive with the contents of housing 15. Mercury is particularly advantageous, however others such as glycerin, water, glycols, and the like may be selected depending on the particular materials being separated. Any mixture which can be separated by fractional crystallization can be separated by the practice of our invention. Examples of such mixtures include, a mixture of benzene and n-heptane, a mixture of p-xylene and m-xylene, a mixture of o-cymene and m-cymene, and the like. Any suitable continuous flexible conveyor with perforate flights may be used, either of the link connected or cable type, such as for example that shown in the cut-away portion 15a of housing 15. Number 17 is a cylinder mounted above housing 16 containing a piston for applying pressure on the liquid seal and therefrom to the materials being separated, and in this manner improving the separation. A suitable means for moving the piston in cylinder 17 is motor 18 which furnishes power through gears 19 and 21 to crank 22 and therefrom to connecting rod 23 and vertical shaft 24. Coil 26 around housing 15 is for applying heat to cause the melting of crystals so that the material from which they are formed may be withdrawn as a liquid. The temperature prevailing in coil 26 can vary over a wide range, and the temperature in any particular case is known to those skilled in the art since it must be at least high enough to melt the crystals as hereinbefore described and the melting point of any particular component is known to the art. The heating coil is diagrammatic and includes other heating means such as electrical heaters (induction) and the like. Coil 27, opposite coil 26 is for cooling the liquid in housing 15 to cause the separation of one of the components therein as crystals which are carried away by the conveyor which is traveling continuously regardless of the pressure cycles to which it is being subjected in the direction of the arrows 28. The temperature prevailing in coil 27 can also vary over a wide range, the temperature in any particular case being sufficiently low to cause separation of one of the components of the mixture from the mixture by freezing that component out as crystals. The temperature in any particular case necessary for this separation is also known to the art and therefore will not be further discussed. Number 29 indicates the level of the sealing liquid extending into housing 15 from the drive unit 16. Sealing liquid can extend into housing 15 from drive unit 16 any desired distance so long as movement of the sealing liquid hereinafter described does not result in loss of the liquid through either of the lines 38 or 39 and so long as the purified component below heating coil 26 cannot communicate with the liquid component contained in housing 15 below cooling coil 27. Line 31 is an inlet to housing 15 for a mixture of materials to be separated by the process of fractional crystallization. Solenoid valve $P_1$ in line 31 is supplied to enable shutting off the feed to housing 15 when pressure is applied on the sealing liquid. Check valve 32 is placed in line 31 to prevent back flow of liquid and pressure on valve $P_1$. Lines 33 and 34 containing valves 36 and 37 respectively are provided to enable filling housing 15 liquid full. These valves, once the apparatus has been charged with liquid, are in a normally closed position. Line 40 and valve 45 are provided for trapping and removing of any of the immiscible sealing liquid that is carried from the U pocket into the loop of the housing in crevices of the conveyor. Line 38, leading from housing 15 below the heating coil, is for the removal of purified product. Solenoid valve $P_2$ in line 38, is used to close the outlet line when pressure is being applied on the seal liquid and concomitantly on the liquid being separated in the crystallizer. Line 39 leading from housing 15 below coil 27 is also for removing separated material and is closed off by solenoid valve $P_3$ when pressure is being applied on the seal liquid.

Figure 2:
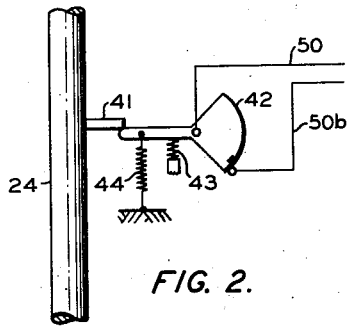
Figure 2 is a diagrammatic view of the mechanism used in conjunction with the apparatus of Figure 1 for simultaneously opening the solenoid valves in the feed inlet and in the product withdrawal lines and cutting off the power when the piston has completed its stroke.
Figure 3:
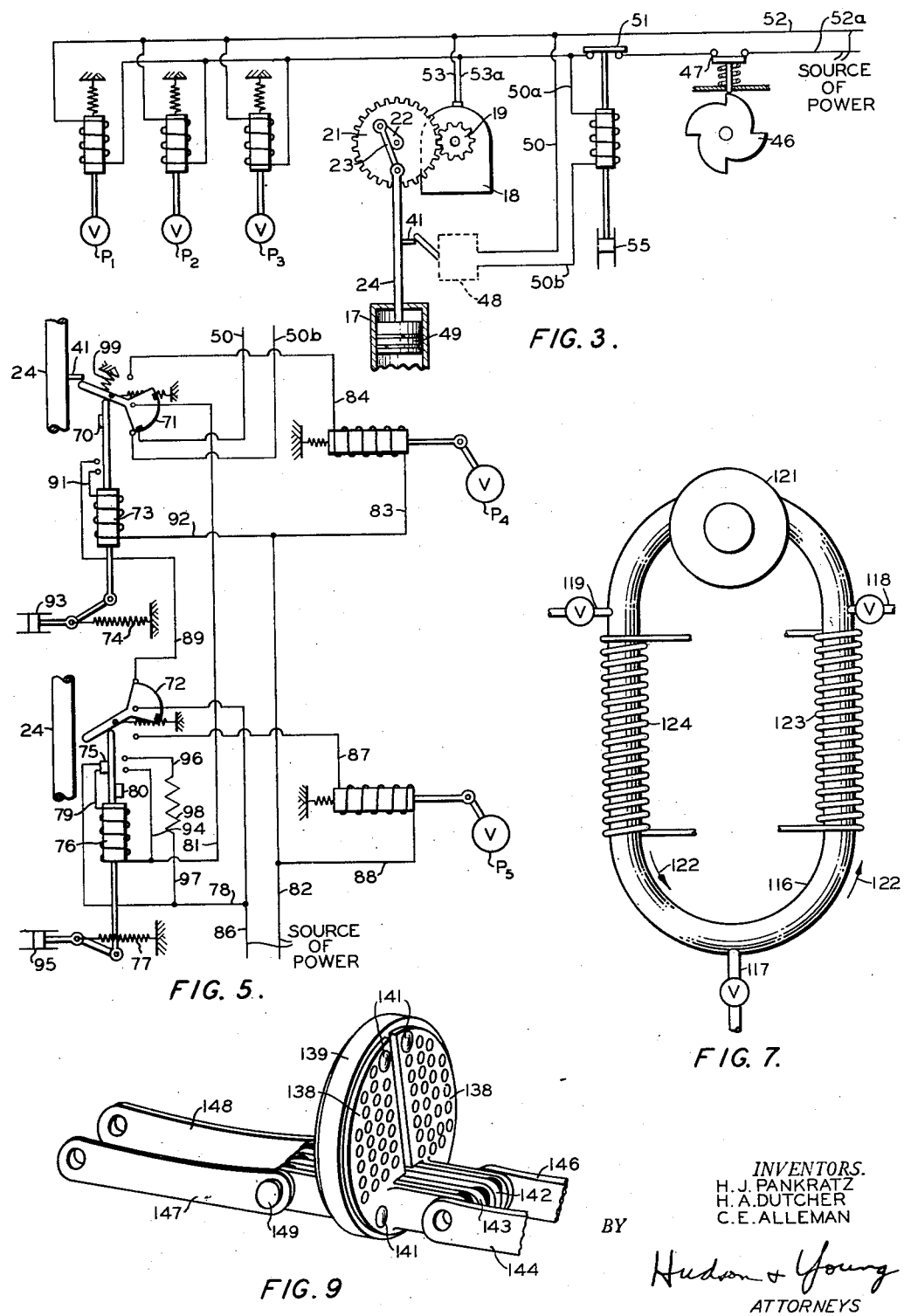

Refer now to Figure 2 which is an enlarged view of the mechanism for deenergizing solenoids of valves $P_1$, $P_2$ and $P_3$, and motor 18 and is used in conjunction with the conventional timing apparatus and circuit shown in Figure 3. Lug 41 attached to vertical shaft 24 contacts the arm of switch 42 on moving downward, moving past it by forcing it against spring 43. This spring moves the arm back in position after lug 41 has passed. This places the arm in position for contact with the lug 41 on the upward stroke. When the lug 41 engages the arm of the switch 42 on the upward movement of the shaft 24, contacts of the circuit comprising lines 50 and 50b are closed momentarily, thereby actuating the solenoid of contact 51 (see Figure 3). Sufficient inertia is present in the power means to carry the vertical shaft 24 upward sufficiently far to cause disengagement of lug 41 with switch 42 allowing spring 44 to move the switch to a position such that the electrical contact is broken.

Refer now to Figure 3 which shows the relationship of the switch mechanism of Figure 2 with the crystallization apparatus of Figure 1, causing a continuous and controlled operation thereof. Similar apparatus to that in Figure 1 will be similarly numbered. The apparatus discussed in relation with this drawing is that which causes regular intermittent application of pressure on the liquid within the crystallizer and concomitant closure of the valves $P_1$—$P_3$. Number 46 is a cam of a conventional timer rotated by a suitable motor and which on rotation intermittently closes plunger-contact 47 which is normally spring biased open. On closing the circuit 52 and 52a, which leads from a power supply, power is passed to circuit 53 and 53a, which leads to motor 18, thus causing it to become energized. The lug 41 attached to the vertical shaft 24 and the switch 42, discussed in regard to Figure 2 and represented by box 48, are so positioned that the switch is actuated by the lug only when piston 49 in cylinder 17 nears the top of its stroke. When the circuit comprising lines 52 and 52a is completed by raising contact 47 the solenoids of normally biased open valves $P_1$—$P_3$, which are those indicated in Figure 1, are energized causing the valves to close at the same time that motor 18 starts. When cog 21 has almost completed a full revolution thus lowering and raising the piston 49 once the switch 42 of Figure 2 represented by box 48 is actuated and likewise the circuit comprising lines 50, 50a, and 50b causing the solenoid actuated contact 51, normally in a closed position, to be opened thus breaking the circuit to motor 18 and causing piston 49 to be stopped in a raised position. The opening of contact 51 also de-energizes the solenoids of valves $P_1$—$P_3$, thereby allowing the valves to open. Contact 51 is normally closed by gravity, however, if it were allowed to close immediately after it has opened, it is conceivable that it might close before cam 46 has moved a sufficient distance to allow contact 47 to break the circuit 52 and 52a, thereby starting up motor 18 before desired. To avoid such an occurrence, dash pot 55 is connected to the movable core of the solenoid attached to contact 51 and so adjusted as to provide suitable lag in the closing of the contact 51 to allow contact 47 to open so the circuit comprising lines 52 and 52a will remain open until it is necessary to repeat the pressure cycle. Conventional solenoid valves, switches, contacts, and the like such as are well known to those skilled in the art can be used.

Refer now to Figure 4 which is of a preferred embodiment of our invention. In this embodiment the pressure applying apparatus of Figure 1 is used to provide an intermittent back-wash of the formed crystals in the crystallizer. The crystallizer shape is also the same, as are the valves $P_1$—$P_3$. For this reason similar pieces of apparatus will be similarly numbered. The specific difference in this apparatus over that of Figure 1 is the means for withdrawal of products and the flushing of the crystals with product obtained by melting the crystals. In the operation of this apparatus the electrical circuits shown in Figure 3 and previously discussed are used with the exception of box 48 which is supplanted by the box 58 of Figure 4 containing the two over-center switches of Figure 5. In addition, the circuits of Figure 5 are also used.

As in all of the embodiments disclosed, the crystal conveying apparatus and the power source operate continuously irrespective of whether the flushing action, hereinafter described, is taking place. In the operation of the apparatus, product comprising the melt from the crystals is withdrawn through line 38a and solenoid valve $P_2$ and is passed to storage tank 56. Similarly, liquid is withdrawn via line 39a, check valve 54, and solenoid valve $P_3$ and is passed to storage tank 57. These are the means used for handling the liquid products when in normal operation without any pressure applied. When pressure is being applied by piston 49 the valves $P_1$—$P_3$ are closed, three-way valve $P_5$ is positioned so that surge chamber 61 communicates with housing 15, and three way valve $P_4$ is positioned so that surge chamber 67 communicates with line 66, more completely described below. The stroke of piston 49 is so adjusted as to displace only the amount of liquid which surge chamber 61 will receive. This chamber may be designed for any desired volume, the volume equalling that which is to be flushed through the crystals on the opposite side of the crystallizer. In this manner all the liquid displaced in housing 15 passes into chamber 61 causing washing action on the crystals above heating coil 26 by the flow of liquid toward the outlet comprising line 39a. Upon piston 49 reaching the bottom of its stroke valve $P_5$ is reversed in such a manner that surge chamber 61 is shut off from line 59, but is opened to line 62, thereby allowing it to drain into tank 57 through line 39a. While valve $P_5$ is allowing liquid to be passed into surge chamber 61, valve $P_4$ is so positioned as to allow pump 63 to withdraw a portion of the liquid from storage tank 56 via line 64 and pass it through line 66 into surge chamber 67. This valve is also a three-way valve which when open to the surge chamber 67 and line 66 is closed to line 68. Line 68 contains a check valve 69 to prevent back flow of product from housing 15 into the surge chamber. When pressure is being released on the liquid in the crystallizer, valve $P_4$ is reversed, opening the surge chamber 67 to lines 68 and 38a and allowing the liquid therein to flow into the crystallizer replacing that which was withdrawn under pressure and causing additional washing of the crystals. Valves $P_4$ and $P_5$ are normally biased to the position shown in Figure 4. Energization of their solenoids reverses their position.

The mechanism for operating the valves of the embodiment of our invention shown in Figure 4 is more clearly shown in Figures 3 and 5. Refer now to these figures along with Figure 4. When motor 18 is stopped, the vertical shaft 24 is at its uppermost position, and the lug 41 is above the arm of over-center switch 71, also in an upward position. In this position of switch 71 circuit 50—50b supplying power to the solenoid operating contact 51 is open, thereby allowing this contact to remain closed. Similarly the circuit comprising lines 86, 78, 79, 81, 82, 83, and 84 to valve $P_4$ is open allowing the valve to remain in its normally spring biased position, which provides passage from line 68 to surge chamber 67. While over-center switch 71 is in its upward position, over-center switch 72 is in a downward position which maintains the circuit comprising lines 86, 87, 88, and 82 open and thereby the valve $P_5$ in its normally spring biased position which provides a passage from surge chamber 61 to line 62. With switch 71 in its upward position the movable core of solenoid 73 is in an upward position also. With the core extended in this manner, held by over-center spring 74, the contact 70 thereon is open, thus maintaining the circuit 86, 89, 91, 92, and 82 inactive. With switch 72 in a downward position the core of solenoid 76 is also in a downward position and the contact 75 is closed, however, the circuit comprising lines 86, 78, 79, 81, 82, 83, and 84 still remains inactive, since the circuit is broken at switch 71. The over-center spring 77 holds the core of solenoid 76 in its downward position.

As the lug 41 on shaft 24 moves downward, it pushes the arm of switch 71 downward until the spring thereon moves it to its lowest position. When this happens, circuit comprising lines 78, 79, 81, 82, 83, 84, and 86 is closed and the solenoid of valve $P_4$ is activated, causing the valve to provide a passage from line 66 to surge chamber 67. At the same time the circuit 86, 78, 79, 81, 84, 83, and 82 is activated, causing the solenoid 76 to become activated and the core thereof to push the arm of switch 72 upward. This closes the circuit comprising lines 86, 87, 88, and 82, thereby activating valve $P_5$ and putting it in a position to make a passage way from line 59 to surge chamber 61. As switch 71 is pushed in a downward position, the core of solenoid 73 is also pushed downward. However, dash-pot 93 is attached thereto to slow down the movement of the core downward to the speed at which shaft 24 is moving. In this way switch 72 is activated before the contact 70 on the core of solenoid 73 connects lines 89 and 91. This prevents completing of the circuit comprising lines 86, 89, 91, and 82 at this point until this same circuit is broken by the upward movement of switch 72 by solenoid 76. This retarded movement prevents solenoid 73 from being activated at this time.

When shaft 24 nears the bottom of its stroke lug 41 contacts the arm of switch 72, pushing it downward until the switch takes it original downward position. In this manner the circuit 86, 87, 88, and 82 is broken allowing valve $P_5$ to take its original spring biased position. When switch 72 takes this downward position the circuit 86, 89, 91, 92, and 82 is closed, thus activating the solenoid 73 and causing the core thereof to push switch 71 in its original upward position. In this position of switch 71 the circuit 86, 78, 79, 81, 84, 83, and 82 is broken allowing valve $P_4$ to assume its original spring biased position.

In order to prolong the life of the solenoids 73 and 76, provision is made for immediately disconnecting the solenoid after it has been activated. This is done by providing contacts 70 and 75 respectively which mantains the circuit during portions of the stroke. Dash pots 93 and 95 provide the necessary retarded movement for sequence operation and springs 74 and 77 the necessary force to complete the movement of the solenoids 73 and 76 respectively after the circuit has been broken. However, in the instances of switch 72, it is necessary to maintain a connection between lines 78 and 81 after contact 75 has been broken. This is done by using contact 80 and the by-pass circuit comprising lines 94, 95, and 97 and resistance 98. Contact 80 is so positioned to provide a constant supply of power to valve $P_4$ while the core of solenoid 76 is changing the contacts in the circuit from 75 to 80. The resistance 98 is equal to the resistance provided by solenoid 76. Spring 74 and 77 maintains the solenoid 73 or 76 in either an upward or downward position.

Near the top of the upward stroke of shaft 24 the lug 41 thereon contacts the arm of switch 71 pushing it still further upward and against spring 99 until it has passed over the end of the arm. By so operating the circuit 50—50b is closed for a brief instant, thereby supplying power to the solenoid of contact 51 breaking the circuit to the motor 18, causing it to stop at the top of its stroke. As previously discussed, the dash-pot 55 is attached to the solenoid of contact 51 to delay the closing of this contact until the circuit comprising lines 52 and 52a has been broken by the timer.

Figure 6:
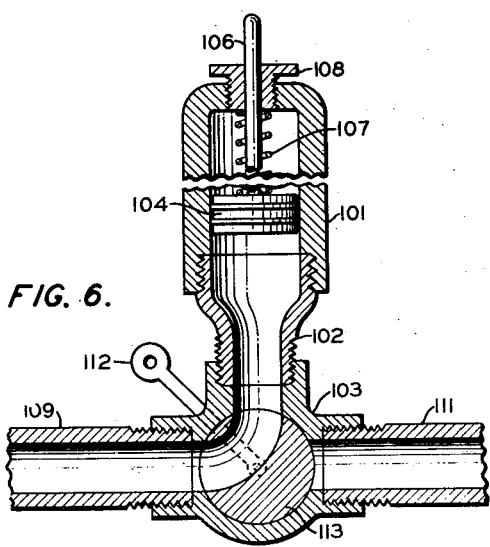
Figure 6 is a vertical cross section of a surge chamber used in conjunction with apparatus of Figure 4.

Refer now to Figure 6, which is of one embodiment of the surge chambers 61 and 67 and valves attached thereto used with the apparatus of Figure 4. Other conventional apparatus of this type may be used. Number 101 is a cylindrical housing, partially closed at one end, of suitable diameter and length to hold the desired volume of liquid. Number 102 is a bottom closure member for said cylinder so designed that it may be readily attached to said cylinder and to three-way valve 103. Number 104 is a piston having axial guide 106 around which spring motor 107 is positioned. Number 108 is an adjustably positioned bushing around guide 106 and in the end of cylinder 101 for varying the tension on spring motor 107. Other suitable motor means may be used as will be well known to those skilled in the art. Numbers 109 and 111 are conduits attached to valve 103 through which liquid is passed. Number 112 is the arm attached to core 113 of the valve to which is attached a suitable means for moving same, such as a solenoid.

Refer now to Figure 7, which is of still another embodiment of our invention. The apparatus shown in this diagram is somewhat similar to that shown in Figure 1. This apparatus in operation utilizes a gas or vapor phase at the top of the oval housing for maintaining the products separate. The construction of the crystallizer housing 116 is preferably circular in cross-section and oval in its general configuration. Line 117 is the feed inlet to the crystallizer and contains a valve for adjustment of flow therethrough. Lines 118 and 119 are for product withdrawal and contain valves for control of the rate of withdrawal. Number 121 indicates the motor and drive means for the conveyor inside housing 116 which is similar to that shown in subsequent Figure 8 except that there is no piston for applying pressure. The arrows 122 indicate the direction in which the crystal conveyor inside housing 116 is traveling. With it moving in the direction indicated, coil 123 is a heating coil for melting crystals of the material to be withdrawn through line 118, while coil 124 is the cooling coil.

Refer now to Figure 8, which is of one embodiment of the drive means for the embodiments of my crystallizer shown in Figures 1, 4, and 7. This apparatus must be modified somewhat to be used in the apparatus of Figure 7, by passing the conveyor over the sprocket drive wheel rather than under, and removal or non-use of the pressure applying piston. In the drawing number 126 is the base for motor 127 and the housing 128. Number 129 is the power transmitting shaft from motor 127 to sprocket 131. This shaft is supported inside of housing 128 by bearing 132. Stuffing box 133 is present to prevent the leakage of the heavy sealing liquid which is present inside of housing 128. Number 135 is the vertical cylindrical housing as shown in Figures 1 and 4. Number 136 is a top closure member for this cylinder through which vertical shaft 24 passes, which is attached to piston 49, as shown in Figures 1 and 4. Numbers 137 are conveyor flights shown in relation to sprocket 131.

Figure 9 is of one conveyor flight showing the perforated construction of the flight and the flexible linkage used to connect more than one flight. Numbers 138 indicate the perforate metal screens through which liquid is passed but which retains crystals. The perforate screen is preferably made in two sections for ease in assembly, however it may be made in one piece which has equal utility. Attached to screen 138 is an abrasion-resistant synthetic rubber disk 139 with perforations therein matching the perforations in the screen. This disk is about the same size as the diameter of the conduit through which it is to pass, and is constructed in this manner so as to scrape crystals from the walls of the housing. Disk 139 may be attached to screen 138 by any suitable means such as by rivets 141. The conveyor flight is attached to the links 142 and 143, and 144 and 146 by a pin not shown with suitable washers as of neoprene rubber between the links and the conveyor flight. Sufficient space is allowed in the flight above and below the normal position of the links extending therethrough to allow the conveyor to be moved easily through curved housings. The links 142 and 143 extending through the flight are attached to links 147 and 148 as by pin 149.

Figure 10 shows the method by which the conveyor in the crystallizer is moved by the sprocket wheel 131 of Figure 8. The links of the conveyor are so assembled as to allow the teeth of the sprocket wheel to extend therein thus providing for the transmission of movement from the sprocket to the conveyor.

The above description of the conveyor flight, conveyor, and power means as shown in Figures 8–10 is merely used as one example of apparatus of this type which may be used. Many other types of continuous conveyors are known, such as those using flexible cables instead of links, and various different types of flights. Any of these which may be adapted for use in apparatus of the type disclosed may be used, and their use is intended to be within the scope of this invention.

Although this invention has been described and exemplified in terms of its preferred modifications, it is understood that various changes

We claim:

1. A fractional crystallizer comprising a hollow conduit, a closed housing joining the ends of said hollow conduit, an endless flexible conveyor within said conduit and said housing, a plurality of perforate flights attached to said conveyor, a heater around said conduit near one end thereof and a cooler around said conduit near the opposite end thereof, an inlet to said conduit for liquid to be fractionally crystallized, means within said housing in communication with said conveyor for causing same to move in the direction from said cooler past said inlet and toward said heater, an outlet from said conduit at the end of said cooler opposite the direction of movement of said conveyor and a second outlet at the end of said heater in the direction of movement of said conveyor, and means for maintaining an immiscible fluid phase between said outlets for separating products of fractional crystallization.

2. An apparatus according to claim 1 wherein said hollow conduit is of circular cross-section.

3. An apparatus according to claim 1 wherein said hollow conduit is in the shape of a loop with a U pocket, said housing being positioned in said U pocket.

4. An apparatus according to claim 1 wherein said hollow conduit is in the shape of an oval.

5. An apparatus according to claim 1 wherein said endless conveyor is comprised of links and perforate flights pivotally attached thereto.

6. An apparatus according to claim 1 wherein said inlet is about midway between the ends of said conduit.

7. A fractional crystallization apparatus comprising a hollow conduit in the shape of a loop with a U pocket, a closed housing attached to the ends of said conduit in said U pocket for containing an immiscible liquid phase between the products of fractional crystallization for maintaining same separated, an endless flexible conveyor within said conduit and said housing, means communicating with the inside of said housing for applying intermittent pressure on liquid therein, a heating coil around said conduit near one end thereof and a cooling coil around said conduit near the opposite end thereof, an inlet to said conduit for liquid to be fractionally crystallized, means within said housing in communication with said conveyor for causing same to move in the direction from said cooling coil past said inlet and toward said heating coil, an outlet from said conduit at the end of said cooling coil opposite the direction of movement of said conveyor for product and an outlet from said conduit at the end of said heating coil in the direction of movement of said conveyor for product, and means for closing said inlet and said outlets while pressure is being applied.

8. In an apparatus according to claim 7, means at the uppermost points of said conduit for bleeding off gas as said crystallizer is being filled.

9. An apparatus according to claim 7, wherein said means communicating with the inside of said housing comprises a cylinder attached to said housing and freely communicating with the inside of said housing, a reciprocatable piston within said cylinder, an axial shaft attached to said piston, a motor, and means connecting said motor to said shaft for causing said piston to reciprocate when said motor is actuated.

10. A fractional crystallization apparatus comprising a vertically positioned hollow circular conduit in the shape of a loop with a U pocket, a closed housing at the bottom of said pocket attached to the ends of said conduit allowing free communication between the ends of said conduit in said U pocket for containing an immiscible phase between the products of said fractional crystallization for maintaining same separated, an endless flexible conveyor within said conduit and said housing; means freely communicating with the inside of said housing for applying intermittent pressure on liquid therein comprising a vertically positioned cylinder attached to the top of said housing, a reciprocatable piston within said cylinder, an axial shaft attached to said piston, a motor, means connecting said motor to said shaft for causing said shaft and said piston to reciprocate when said motor is actuated; a heating coil around said conduit near one end thereof and a cooling coil around said conduit near the opposite end thereof, an inlet to said conduit intermediate the ends thereof for liquid to be fractionally crystallized, means within said housing in communication with said conveyor for causing same to move in the direction from said cooling coil past said inlet and toward said heating coil, a product outlet from said conduit at the end of said cooling coil opposite the direction of movement of said conveyor and a product outlet from said conduit at the end of said heating coil in the direction of movement of said conveyor, means for controlling the application of pressure and for closing said inlet and said outlets comprising normally open solenoid valves in said inlet and said outlets, an electrical circuit connecting in parallel said valves and said motor for actuating said piston, a timer in series with said circuit which upon reaching a predetermined position closes said circuit thereby actuating the solenoids of said valves causing them to close and starting said motor and causing said piston to reciprocate, a lug on said axial shaft which is attached to said piston positioned to actuate a contact in a second circuit in parallel with the first circuit when said piston is at the top of its stroke causing a solenoid contact in series with said first circuit to become actuated thereby breaking said first circuit and causing said motor to stop and said solenoid valves to open, and a dash pot attached to said solenoid contact for slowing the closure of said contact until said timer has reached a position at which said first circuit will remain broken.

11. A fractional crystallization apparatus which comprises a vertically positioned hollow circular conduit in the shape of a loop with a U pocket, a closed housing at the bottom of said pocket attached to the ends of said conduit allowing free communication between the ends thereof for containing an immiscible liquid phase between the products of said fractional crystallization, an endless flexible conveyor within said conduit and said housing, means freely communicating with the inside of said housing for applying intermittent pressure on liquid therein, a heating coil around said conduit near one end thereof and a cooling coil around said conduit near the opposite end thereof, an inlet to said conduit for liquid to be fractionally crystallized, means within said housing for moving said conveyor in the direction from said cooling coil past said inlet and toward said heating coil, an outlet for said conduit for product at the end of said cooling coil opposite the direction of movement of said conveyor and an outlet from said conduit for product at the end of said heating coil in the direction of movement of said conveyor, solenoid valves for closing said inlet and said outlets while pressure is being applied, a first surge chamber connected with the outlet at the end of said cooling coil between said solenoid valve and said conduit, means for opening said first surge chamber to said outlet when pressure is being applied by said piston and thereby allowing said chamber to fill with liquid, means for discharging said first surge chamber to storage when pressure is not being applied, a second surge chamber connected with the outlet at the end of said heating coil between said solenoid value and said conduit, means for closing off said second surge chamber when pressure is being applied and concomitantly filling said second surge chamber from storage, and means for discharging said second surge chamber into said conduit as pressure on the liquid therein is being reduced thereby replacing the liquid withdrawn in the first mentioned chamber.

12. A fractional crystallization apparatus comprising a vertically positioned hollow circular conduit in the shape of a loop with a U pocket, a closed housing at the bottom of said pocket attached to the ends of said conduit allowing free communication between the ends of said conduit, an endless flexible conveyor within said conduit and said housing; means freely communicating with the inside of said housing for applying intermittent pressure on liquid therein comprising a vertically positioned cylinder attached to the top of said housing, a reciprocatable piston within said cylinder, an axial shaft attached to said piston, a motor, means connecting said motor to said shaft for causing said shaft and said piston to reciprocate when said motor is actuated; a heating coil around said conduit near one end thereof and a cooling coil around said conduit near the opposite end thereof, an inlet to said conduit intermediate the ends thereof for liquid to be fractionally crystallized, means within said housing in communication with said conveyor for causing same to move in the direction from said cooling coil past said inlet and toward said heating coil, a product outlet from said conduit at the end of said cooling coil opposite the direction of movement of said conveyor and a product outlet from said conduit at the end of said heating coil in the direction of movement of said conveyor, a first solenoid valve for closing said inlet, a second solenoid valve for closing said outlet at the end of said cooling coil and a third solenoid valve for closing said outlet at the end of said heating coil while pressure is being applied, a first surge chamber connected with the outlet at the end of said cooling coil between said second solenoid valve and said conduit with a first three-way solenoid valve normally biased in a position allowing passage from said chamber to storage, a second surge chamber connected with the outlet at the end of said heating coil between said third solenoid valve and said conduit with a second three-way solenoid valve normally biased in a position allowing passage from said chamber into said outlet; means for opening and closing said first, second, and third solenoid, valves, for actuating the motor drive for said piston, and for opening and closing the first and second three-way solenoid valves which comprises a first electrical circuit connecting in parallel said first, second, and third solenoid valves and the motor for actuating said piston, a timer in series with said first circuit which when reaching a predetermined position closes said first electrical circuit thereby actuating the solenoids of said valves causing them to close and starting said motor and causing said piston to reciprocate, a lug on said axial shaft attached to said piston, said lug being so positioned that on the downward stroke of said piston a double-pole double-throw switch is reversed thereby closing a second electrical circuit containing said second three-way solenoid valve and thereby reversing same, a first solenoid the core of which extends outward from each end, the position of which is concomitantly reversed with said double-pole double-throw switch from that position caused by actuation of said first solenoid to that ready for actuation, the closing of said second electrical circuit concomitantly actuating a second solenoid so positioned that the core thereof reverses a single-pole double-throw switch which in turn closes a third electrical circuit containing said first three-way solenoid valve, a contact on the core of said first solenoid which on reversal of the core closes a fourth electrical circuit containing the coil thereabout, the reversal of said single-pole double-throw switch breaking the fourth electrical circuit containing the coil of said first solenoid, said lug on said vertical shaft near the bottom of its downward stroke reversing the position of said single-pole double-throw switch thereby actuating the fourth electrical circuit containing the coil of said first solenoid thereby reversing said first solenoid and causing said double-pole, double-throw switch to be reversed thereby breaking said second electrical circuit containing said second three-way solenoid valve causing same to resume its normally biased position and concomitantly breaking said third electrical circuit containing said first three-way solenoid valve allowing it to resume its normally biased position, said lug near the top of the stroke of said piston contacting the arm of said double-pole double-throw switch depressing same and making a brief contact thereby closing a fifth electrical circuit containing a solenoid actuated switch the contacts of which are in series with said electrical circuit containing the motor driving said piston and actuating said solenoid actuated switch thereby breaking said first electrical circuit for a sufficient length of time to allow said timer to resume a position maintaining said first electrical circuit broken.

13. A fractional crystallization process which comprises introducing a mixture to be separated to a fractional crystallization zone, cooling said mixture and thereby causing one component thereof to separate as crystals, continuously moving said crystals from the cooling zone to a heating zone, melting said crystals and withdrawing the melt as product of the process, recovering the non-crystallizing component as a second product, intermittently applying pressure to the mixture being separated and concomitantly stopping introduction of said mixture to be separated and withdrawal of the melt, continuing to withdraw non-crystallizing material while said pressure is being applied, suspending withdrawal of non-crystallizing material as pressure is released and concomitantly introducing previously withdrawn melt to the crystallization zone through the melt withdrawal zone in sufficient quantity to replace the liquid withdrawn during said application of pressure, and thereby washing the crystals and enabling withdrawal of a more pure product melt.

HOWARD J. PANKRATZ.
      HARRIS A. DUTCHER.
      CARL E. ALLEMAN.

REFERENCES CITED

The following references are of record in the file of this patent:

UNITED STATES PATENTS

| Number | Name | Date |
|---|---|---|
| 400,983 | Williams | Apr. 9, 1889 |
| 1,438,558 | Schulze | Dec. 12, 1922 |
| 1,738,275 | Baker | Dec. 3, 1929 |
| 1,857,884 | Skogmark | May 10, 1932 |
| 1,898,758 | Bottoms | Feb. 21, 1933 |
| 2,481,653 | Freeman | Sept. 13, 1949 |
| 2,540,083 | Arnold | Feb. 6, 1951 |
| 2,541,682 | Arnold | Feb. 13, 1951 |